United States Patent
Jaworski et al.

(10) Patent No.: US 12,240,397 B2
(45) Date of Patent: Mar. 4, 2025

(54) SIDE IMPACT GUARD FOR TRAILERS

(71) Applicant: HYUNDAI TRANSLEAD, San Diego, CA (US)

(72) Inventors: Leszek Stefan Jaworski, Chula Vista, CA (US); Oscar E. Montiel Rosales, San Diego, CA (US)

(73) Assignee: Hyundai Translead, San Diego, CA (US)

( * ) Notice: Subject to any disclaimer, the term of this patent is extended or adjusted under 35 U.S.C. 154(b) by 273 days.

(21) Appl. No.: 18/071,996

(22) Filed: Nov. 30, 2022

(65) Prior Publication Data
US 2024/0174192 A1    May 30, 2024

(51) Int. Cl.
B60R 19/56    (2006.01)

(52) U.S. Cl.
CPC .................................. B60R 19/565 (2013.01)

(58) Field of Classification Search
CPC ........ B60R 19/565; B60R 19/56; B60J 19/42; B62D 35/001; B62D 35/002
USPC ........ 293/128; 296/180.4; 14/69.5, 73, 73.1, 14/73.5, 74, 74.5, 75, 76, 77.1, 77.3
See application file for complete search history.

(56) References Cited

U.S. PATENT DOCUMENTS

| | | | | |
|---|---|---|---|---|
| 10,940,817 B2 * | 3/2021 | Kunkel | ................ | B62D 35/008 |
| 10,946,824 B2 * | 3/2021 | Kunkel | ................ | B60R 19/565 |
| 11,305,713 B2 * | 4/2022 | Batzer | .................... | B60R 19/56 |
| 2016/0207484 A1 * | 7/2016 | Rogers | ................. | B60R 19/565 |
| 2018/0304941 A1 * | 10/2018 | Ehrlich | ............... | B62D 35/001 |
| 2020/0269789 A1 * | 8/2020 | Ponder | ................. | B60R 19/565 |

* cited by examiner

*Primary Examiner* — Amy R Weisberg
*Assistant Examiner* — Denise L. Esquivel
(74) *Attorney, Agent, or Firm* — Knobbe, Martens, Olson & Bear, LLP

(57) ABSTRACT

A side impact guard for a trailer, including: a plurality of un-reinforced crossmember assemblies spaced out and attached to a base assembly of the trailer; a plurality of reinforced crossmember assemblies spaced out between the plurality of un-reinforced crossmember assemblies; a plurality of lattice assemblies, wherein each lattice assembly is coupled to a reinforced crossmember assembly, each lattice assembly including a pair of vertical struts, a pair of diagonal struts, and a horizontal strut, wherein each of the pair of vertical struts attaches to the reinforced crossmember assembly at one end and the pair of diagonal struts at the other end, wherein each of the pair of diagonal struts attaches to the reinforced crossmember assembly at one end the vertical struts at the end, wherein the horizontal strut attaches to the pair of diagonal struts.

18 Claims, 10 Drawing Sheets

SIDE IMPACT GUARD FOR TRAILERS

BACKGROUND

Field

The present disclosure relates to commercial trailers, and more specifically, to the side impact guard for the commercial trailers.

Background

Current commercial trailers over 10,000 lbs. are required to be equipped with compliant rear impact guards that reduce the possibility of underride occurring in the event of a collision from a passenger vehicle into the rear of the trailer. However, the commercial trailers are not required to be equipped with any such device (i.e., a side impact guard) on the side-center of the trailer to reduce the possibility of underride occurring in the event of a collision into the side of the trailer. Thus, current designs of the side impact guard may not provide sufficient protection for the passenger vehicles against the underride, while resulting in high-cost damage to the trailer. Accordingly, many side impact guard designs have numerous issues to resolve.

SUMMARY

The present disclosure provides for an improved side impact guard for energy absorption, manufacturability, installation, and compatibility.

In one implementation, a side impact guard for a trailer includes a plurality of un-reinforced crossmember assemblies, a plurality of reinforced crossmember assemblies, and a plurality of lattice assemblies. The plurality of un-reinforced crossmember assemblies is spaced out and attached to a base assembly of the trailer. The plurality of reinforced crossmember assemblies is spaced out between the plurality of un-reinforced crossmember assemblies. Each lattice assembly is coupled to a reinforced crossmember assembly and includes a pair of vertical struts, a pair of diagonal struts, and a horizontal strut. Each of the pair of vertical struts attaches to the reinforced crossmember assembly at one end and the pair of diagonal struts at the other end. Each of the pair of diagonal struts attaches to the reinforced crossmember assembly at one end the vertical struts at the end. The horizontal strut attaches to the pair of diagonal struts.

In another implementation, a side impact guard for a trailer includes a plurality of crossmember assemblies and a plurality of lattice assemblies. The plurality of crossmember assemblies is coupled to a base assembly of the trailer, and each crossmember assembly of the plurality of crossmember assemblies is one of an un-reinforced crossmember assembly or a reinforced crossmember assembly. Each lattice assembly of the plurality of lattice assemblies is coupled to the reinforced crossmember assembly. Each lattice assembly also includes first and second vertical struts, first and second diagonal struts, and a horizontal strut. A first end of the first vertical strut couples to a first outer portion of the reinforced crossmember assembly and a second end of the first vertical strut couples to a second end of the first diagonal strut. A first end of the first diagonal strut couples to an inner portion of the reinforced crossmember assembly. A first end of the second vertical strut couples to a second outer portion of the reinforced crossmember assembly and a second end of the second vertical strut couples to a second end of the second diagonal strut. A first end of the second diagonal strut couples to the inner portion of the reinforced crossmember assembly. A first end of the horizontal strut couples to an upper portion of the first diagonal strut and a second end of the horizontal strut couples to an upper portion of the second diagonal strut.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1:
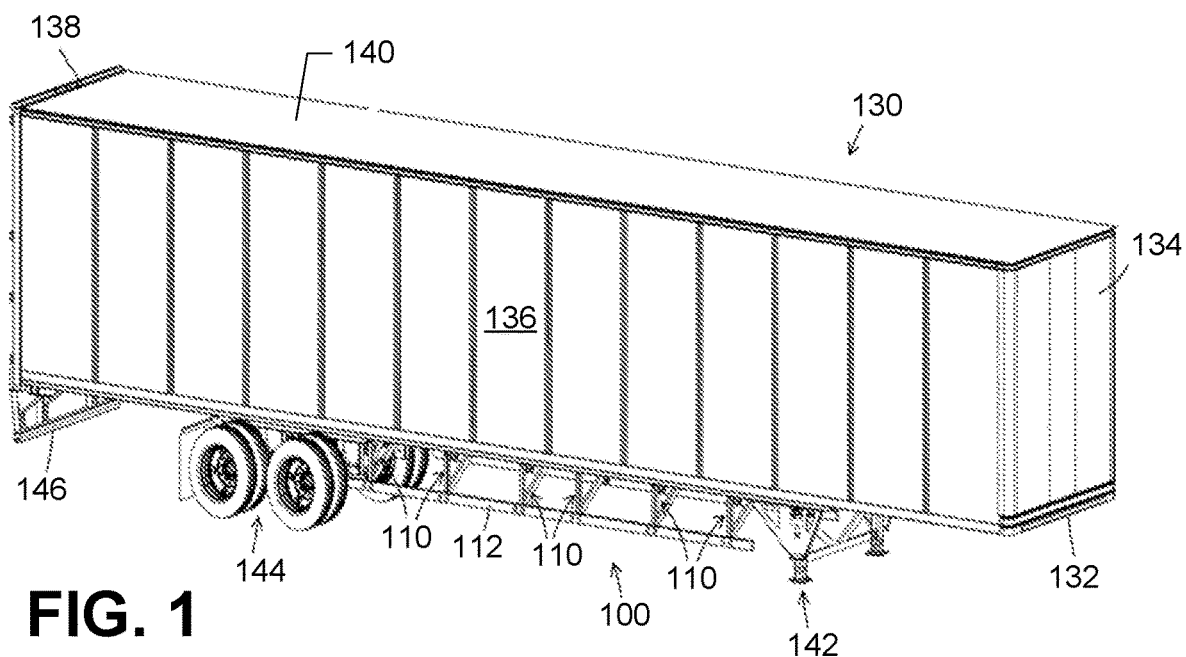
FIG. 1 is a perspective view of a side impact guard mounted on a trailer in accordance with one implementation of the present disclosure.

A side impact guard is usually installed on the center underbelly area of a trailer and is designed so that when a vehicle impacts or strikes the side of the trailer (where this device is installed), the side impact guard limits the distance that the striking vehicle's front-end slides under the trailer. However, as described above, current designs of the side impact guard have numerous issues related to the safety and cost.

For example, conventional side impact guards are designed such that the impact energy from the side collision is transferred to the side wall assemblies. That is, when a passenger vehicle impacts or strikes one side of the trailer, the forces are transferred to the opposite side wall of the impact. Further, the damage caused on the sides of the trailer may result in expensive repairs and/or an inoperable trailer.

Certain implementations of the present disclosure include improved side impact guard designs for energy absorption, manufacturability, installation, and compatibility (i.e., across van products and third-party trailer accessories). In some implementations, the improved side impact guard design provides, among others. (a) reinforced crossmembers with specialized lattice mounting; (b) standardized parts for simplified manufacturing and installation; and (c) an in-board design.

In one implementation, the reinforced crossmembers include and/or provide: (a) lattice structures mounted directly to the crossmember at three points along the width of the crossmember; (b) impact energy transfer directed not only to the side impact guard but also to the trailer floor structure (bay area crossmembers); (c) the crossmembers reinforced with doubler plates to optimize the energy transfer from the lattice structure and reduce further transfer to other trailer structure; (d) a specialized crossmember design to reduce damage to other trailer components (in the event of damage from an impacting vehicle) so that only the reinforced crossmembers may need to be replaced.

In one implementation, the standardized parts include: (a) lattice assemblies and reinforced crossmembers designed to be identical, which allow for easy installation into different base layouts specified by end customers; and (b) the reinforced crossmembers are part of the base assembly and allow for easy installation of lattice assemblies, because. the design is optimized for manufacturing line installation.

In one implementation, the in-board design serves following purposes: (a) enables installation of numerous side skirt aerodynamic products without interference; (b) the position of outer mount plates of the lattice assembly reduces damage to crossmember clips and side bottom rail caused by ground impacts of the horizontal member of the side impact guard during normal operation.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

FIG. 1 is a perspective view of side impact guard 100 mounted on a trailer 130 in accordance with one implementation of the present disclosure. In the illustrated implementation of FIG. 1, the trailer 130 includes and/or couples to side walls 136, a front wall 134, a rear wall 138, a base assembly 132 (i.e., the trailer floor), a roof assembly 140, a rear impact guard 146, a suspension assembly 144 (i.e., the tire suspension), a landing gear assembly 142, and the side impact guard 100. In one implementation, the side impact guard 100 is mounted on the bottom of the trailer 130 and includes, among others, multiple lattice assemblies 110 (e.g., 6 are shown in FIG. 1) and horizontal members 112 (e.g., 2 are shown in FIG. 1).

Figure 2:
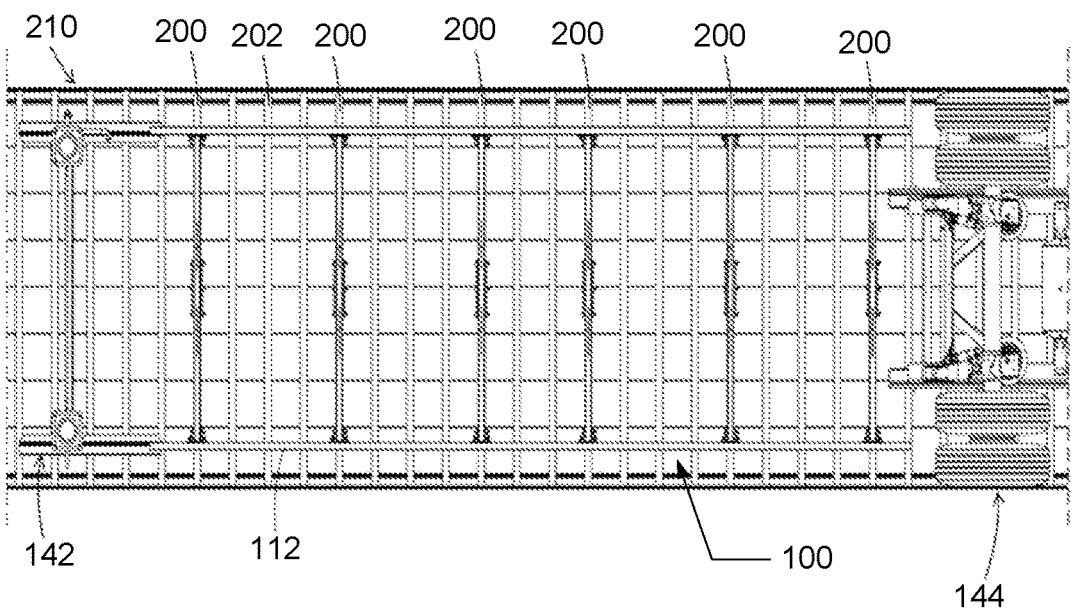
FIG. 2 is a bottom view of the mounted side impact guard mounted on a base assembly of a trailer in accordance with one implementation of the present disclosure.

FIG. 2 is a bottom view of the mounted side impact guard 100 in accordance with one implementation of the present disclosure. The illustrated implementation of FIG. 2 also shows side bottom rails 210 which form a structural element of the trailer 130 and connect the side walls 136 to the base assembly 132. In one implementation, the side bottom rails 210 are composed of aluminum or steel.

As further shown in FIG. 2, in one implementation, the side impact guard 100 includes or couples to cross member assemblies 202, 200, some (referred to as reinforced crossmember assemblies 200) of which couple to the lattice assemblies 110. The number of the lattice assemblies 110 and the crossmember assemblies 202, 200 may vary between trailer types, for example, short trailers with smaller bay areas may have less, while long trailers with larger bay areas may have more.

Figure 3:
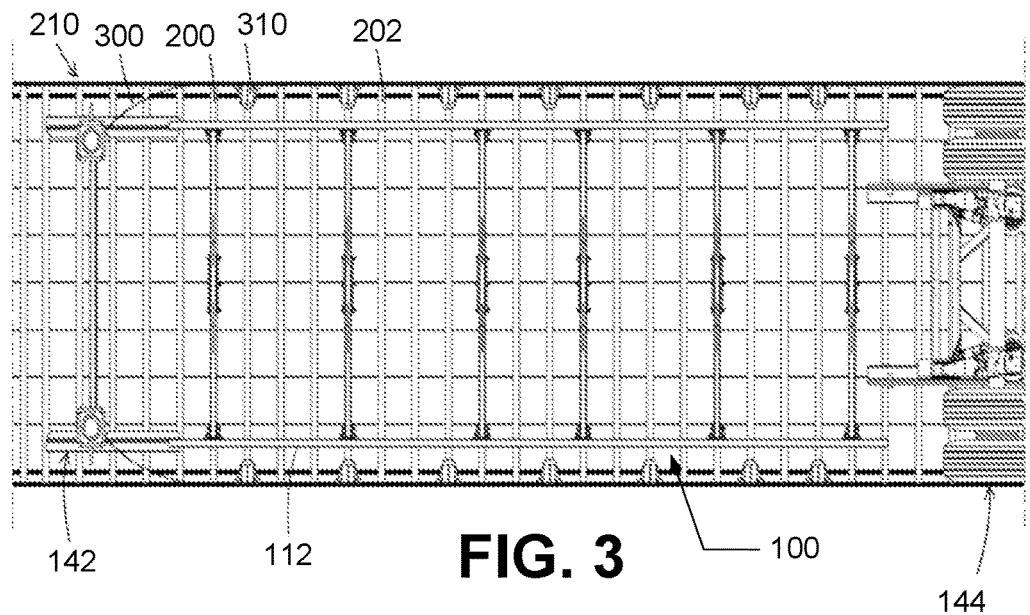
FIG. 3 is a bottom view of the mounted side impact guard shown with a side skirt device in accordance with one implementation of the present disclosure.

FIG. 3 is a bottom view of the mounted side impact guard 100 shown with a side skirt device including side skirt panels 300 and side skirt mounting brackets 310 in accordance with one implementation of the present disclosure.

Figure 4:
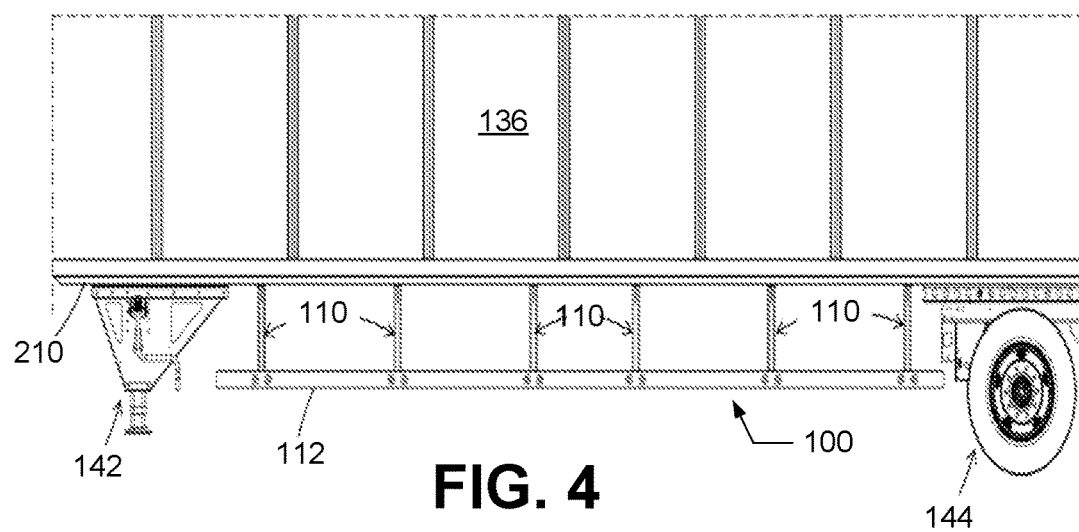
FIG. 4 is a side view of the mounted side impact guard in accordance with one implementation of the present disclosure.

FIG. 4 is a side view of the mounted side impact guard 100 in accordance with one implementation of the present disclosure.

Figure 5:
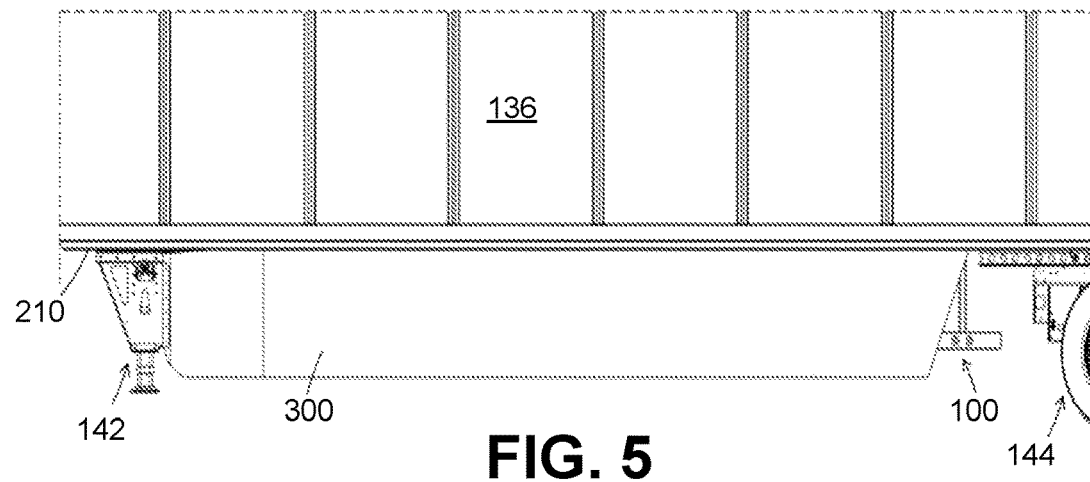
FIG. 5 is a side view of the mounted side impact guard shown with a side skirt device in accordance with one implementation of the present disclosure.

FIG. 5 is a side view of the mounted side impact guard 100 shown with a side skirt device including side skirt panels 300 in accordance with one implementation of the present disclosure.

Figure 6:
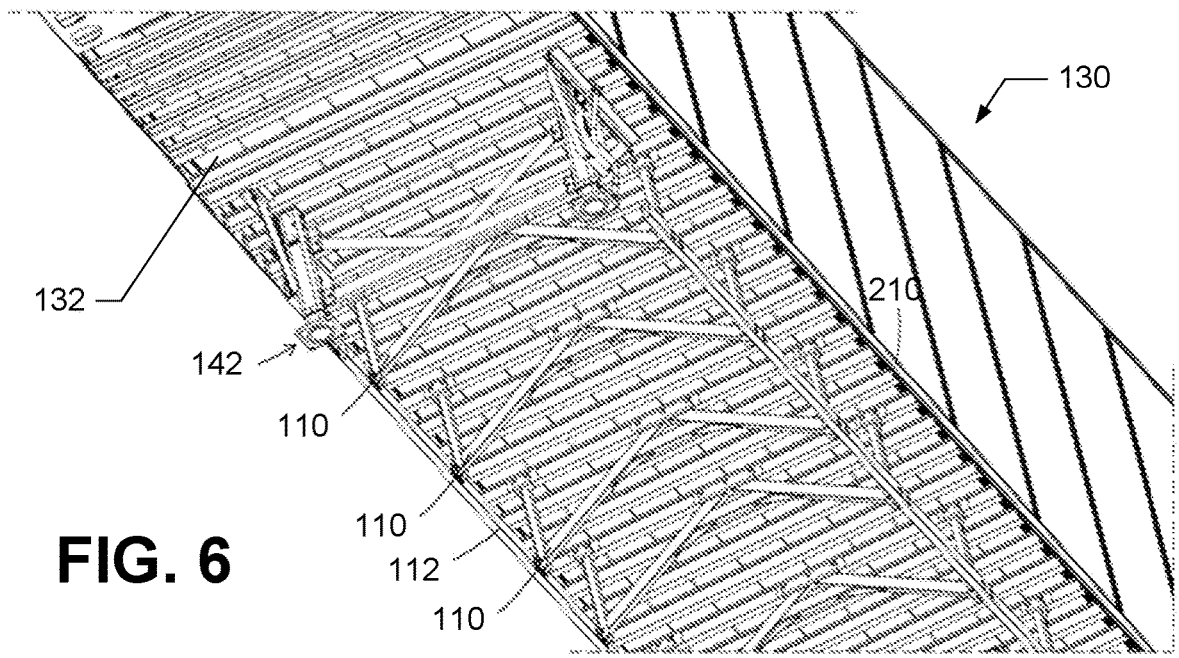
FIG. 6 is a perspective view of the mounted side impact guard in accordance with one implementation of the present disclosure.

FIG. 6 is a bottom perspective view of the mounted side impact guard 100 shown with the lattice assemblies 110 and horizontal members 112 in accordance with one implementation of the present disclosure. The illustrated implementation of FIG. 6 shows the side impact guard 100 mounted to the bottom of the base assembly 132. In one implementation, the horizontal members 112 stretch from near the landing gear 142 to near the running gear (suspension assembly) underneath the trailer 130.

Figure 7:
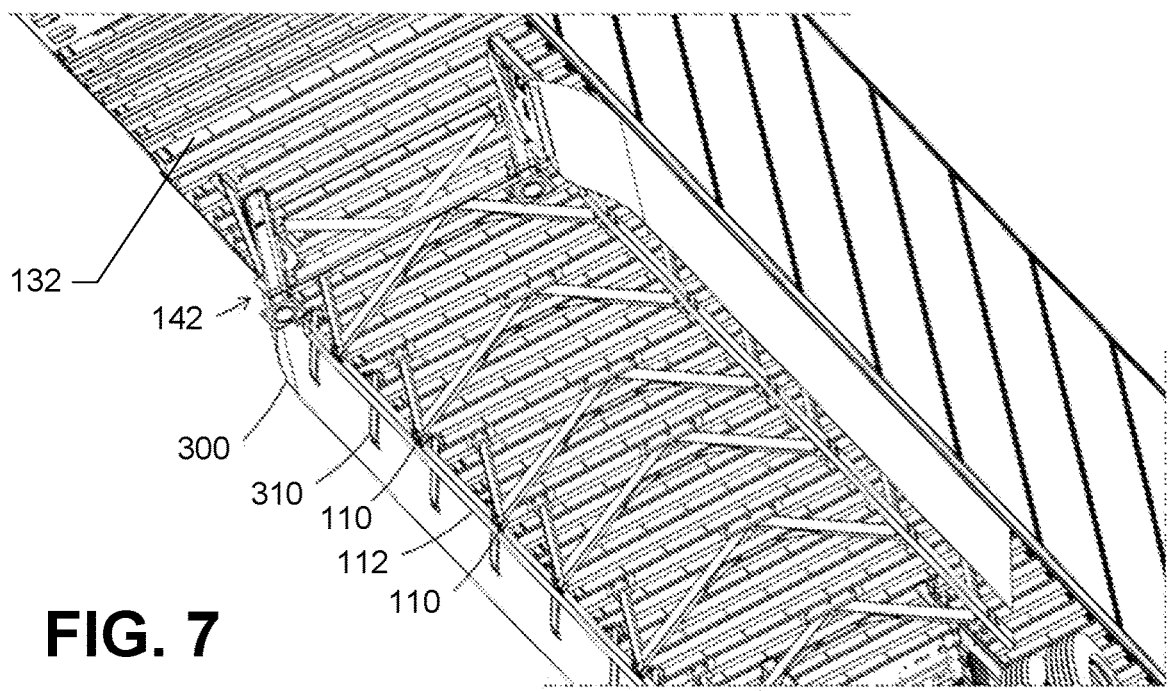
FIG. 7 is a perspective view of the mounted side impact guard shown with a side skirt device in accordance with one implementation of the present disclosure.

FIG. 7 is another bottom perspective view of the mounted side impact guard 100 shown with the side skirt device including the side skirt panels 300 in accordance with one implementation of the present disclosure. The illustrated implementation of FIG. 7 shows the side impact guard 100 mounted to the bottom of the base assembly 132.

Figure 8:
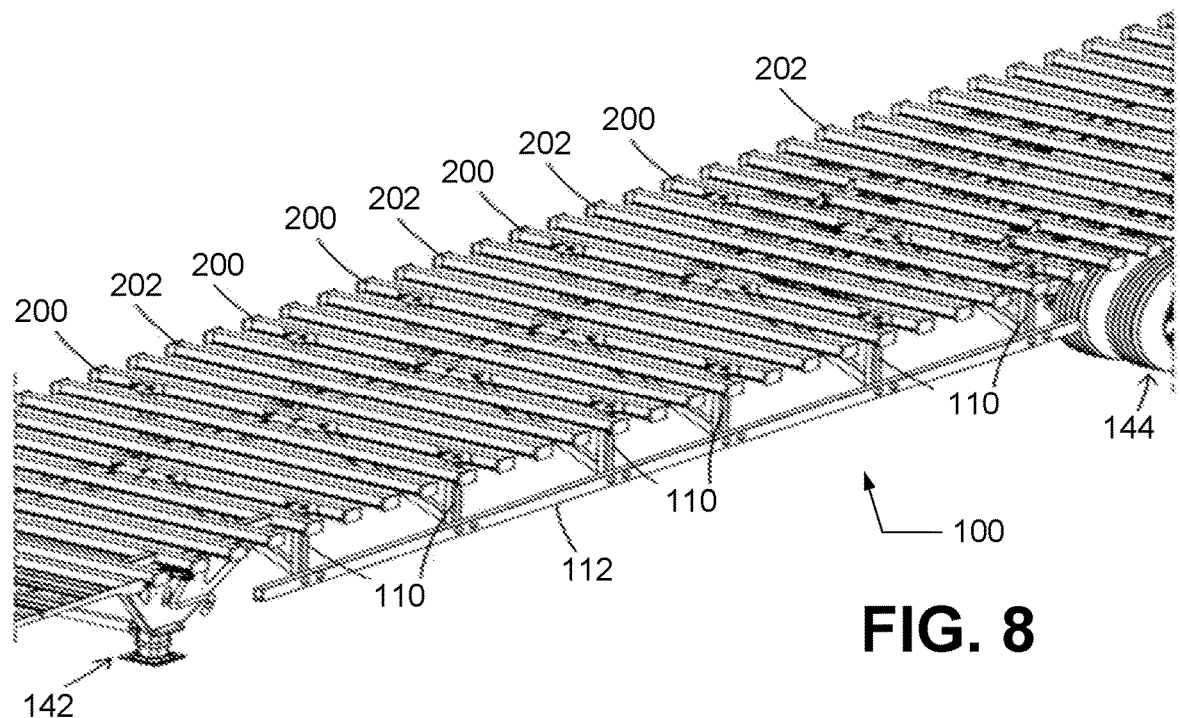
FIG. 8 is a perspective view of a side impact guard installed on the base assembly in accordance with one implementation of the present disclosure.

FIG. 8 is a top perspective view of the side impact guard 100 including the un-reinforced crossmember assemblies 202 and the reinforced crossmember assemblies 200 in accordance with one implementation of the present disclosure. FIG. 8 shows that the reinforced crossmember assemblies 200 couple to the lattice assemblies 110. The reinforced crossmember assemblies 200 are installed on the bottom of the base assembly 132 of the trailer 130 and are the primary attachment points to the trailer structure for the side impact guard 100.

Figure 9:
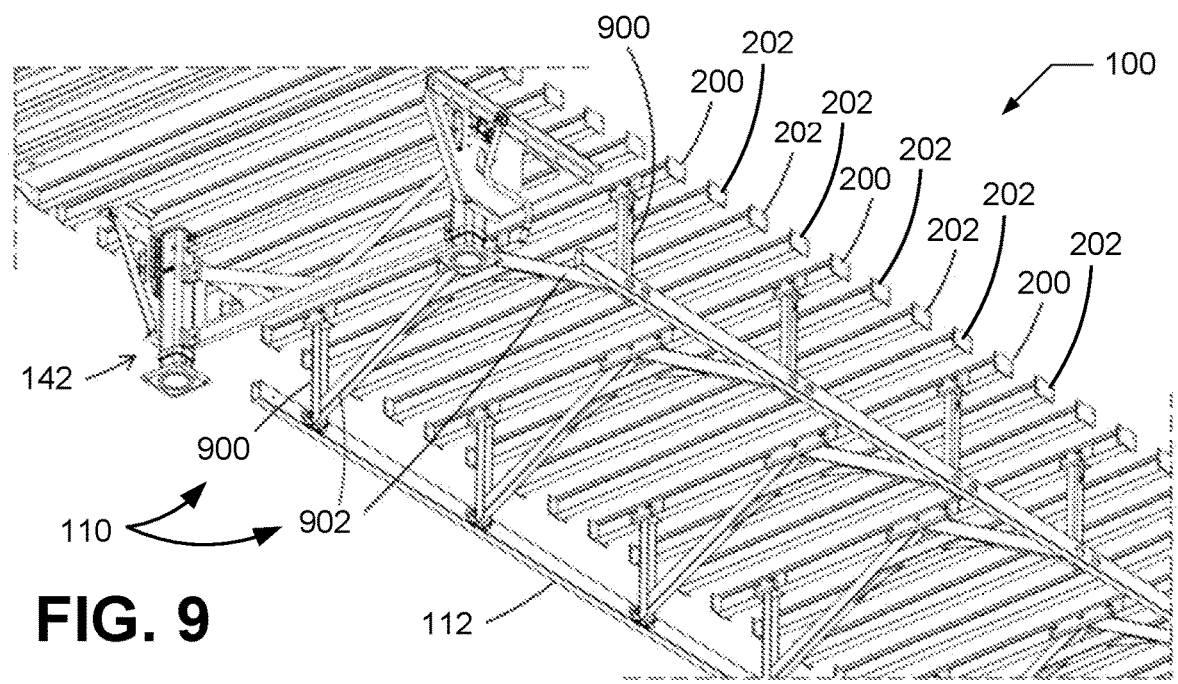
FIG. 9 is a perspective view of the forward section of the side impact guard installed on the base assembly in accordance with one implementation of the present disclosure.

FIG. 9 is a bottom perspective view of the side impact guard 100 including the crossmember assemblies 202, 200, the lattice assemblies 110, and the horizontal members 112 in accordance with one implementation of the present disclosure. As stated above, the number of the lattice assemblies 110 and the crossmember assemblies 202, 200 may vary between trailer types, for example, short trailers with smaller bay areas may have less, while long trailers with larger bay areas may have more. In one implementation, the side impact guard 100 may be mounted to the bottom of the base assembly 132. In the illustrated implementation of FIG. 9, each of the lattice assemblies 110 includes a pair of vertical struts 900 and a pair of diagonal struts 902.

In one implementation, the lattice assemblies 110 and the corresponding reinforced crossmember assemblies 200 and un-reinforced crossmember assemblies are spaced out in a bay area (i.e., area around the bay assembly 2) of the trailer 130. The spacing (of the lattice assemblies 110 and the corresponding reinforced crossmember assemblies 200) depends on the customer base crossmember layout requirement (e.g., 12", 10", or 8"). In one example implementation, the reinforced crossmember assemblies 200 are spaced 12" apart from each other. The reinforced crossmember assemblies 200 are included in the bay area with the un-reinforced crossmembers 202. In one implementation, as the trailer 130 proceeds down the manufacturing line, the lattice assemblies 110 are attached to the reinforced crossmember assemblies 200 with nuts and bolts. Subsequently, the horizontal members 112 (one on each side of the trailer) are attached to the lattice assemblies 110 with nuts and bolts.

Figure 10:
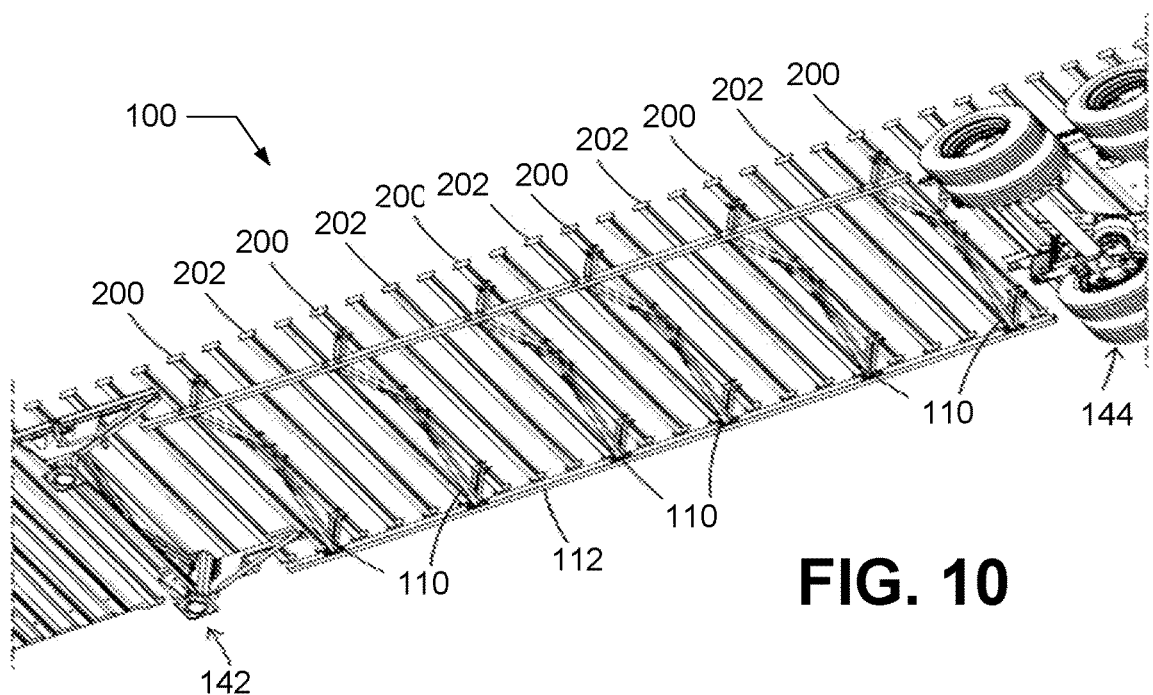
FIG. 10 is a bottom perspective view of the side impact guard installed on the base assembly in accordance with one implementation of the present disclosure.

FIG. 10 is a bottom perspective view of the side impact guard 100 mounted on the base assembly 132 of the trailer 130 in accordance with one implementation of the present disclosure.

Figure 11:
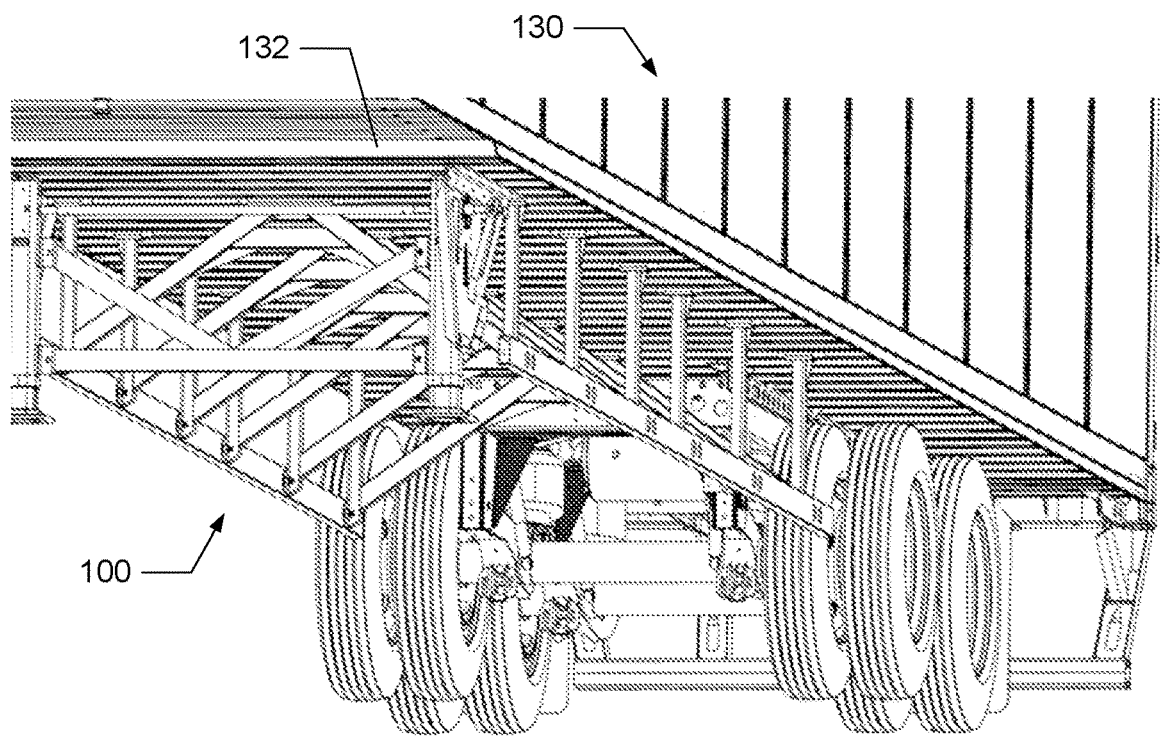
FIG. 11 is a front perspective view of the side impact guard mounted on a trailer in accordance with one implementation of the present disclosure.

FIG. 11 is a bottom front perspective view of the side impact guard 100 mounted on the base assembly 132 of the trailer 130 in accordance with one implementation of the present disclosure.

Figure 12:
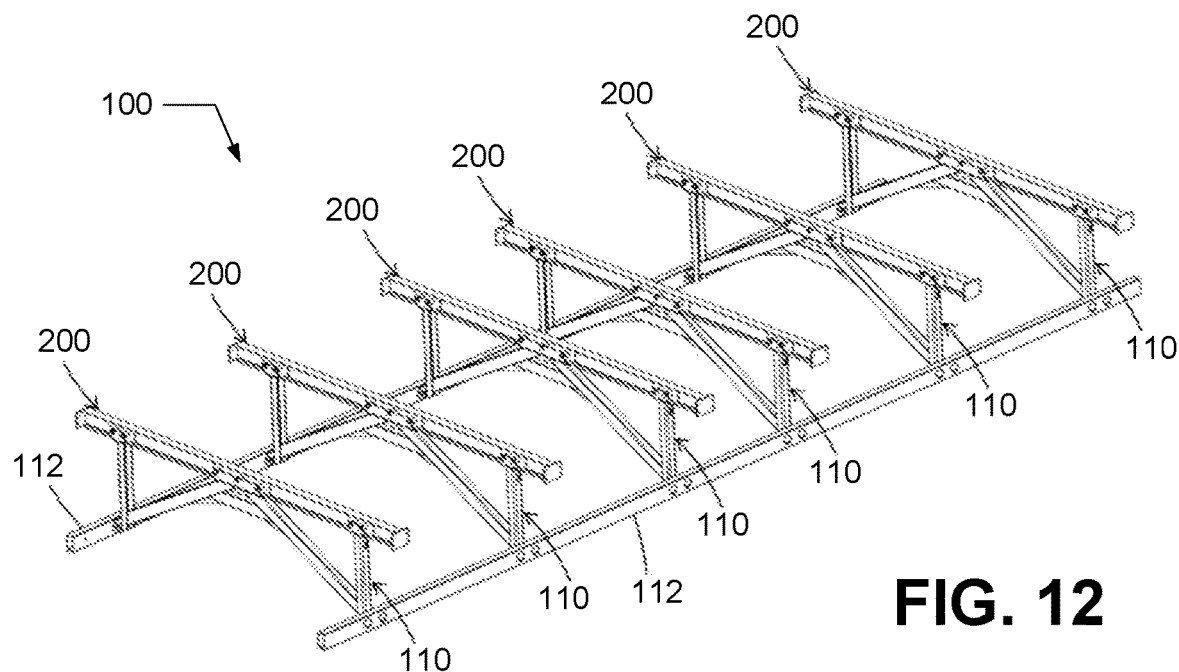
FIG. 12 is a side perspective view of the side impact guard in accordance with one implementation of the present disclosure.

FIG. 12 is a side perspective view of the side impact guard 100 including only the reinforced crossmember assemblies 200, the lattice assemblies 110, and the horizontal members 112 in accordance with one implementation of the present disclosure.

Figure 13:
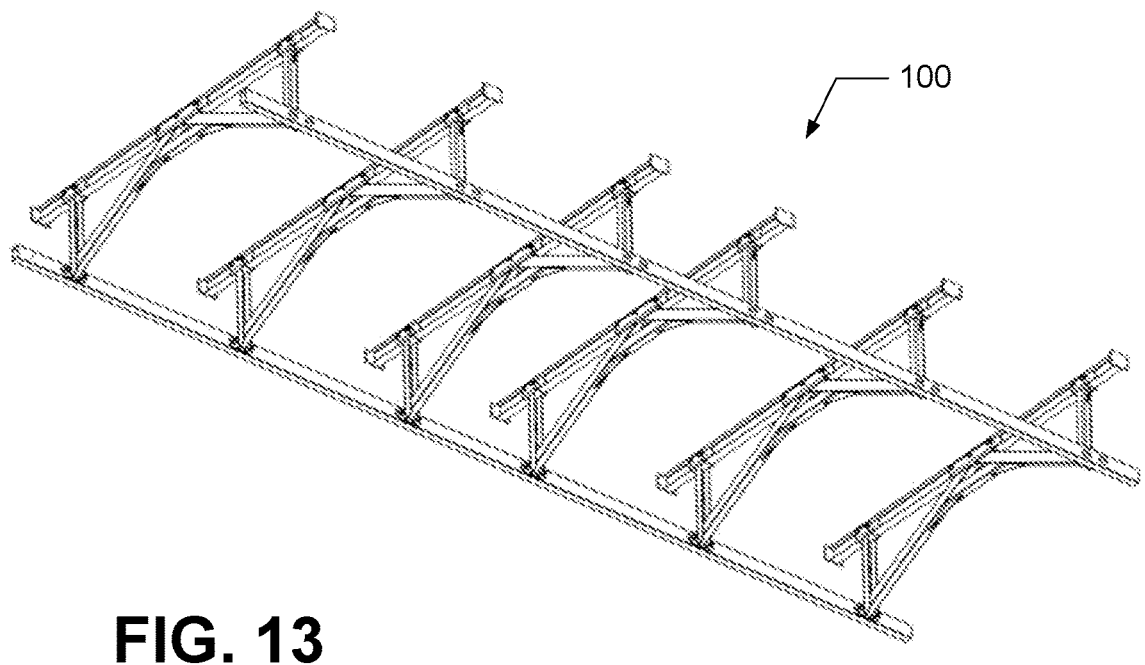
FIG. 13 is a bottom perspective view of the side impact guard in accordance with one implementation of the present disclosure.
Figure 14:
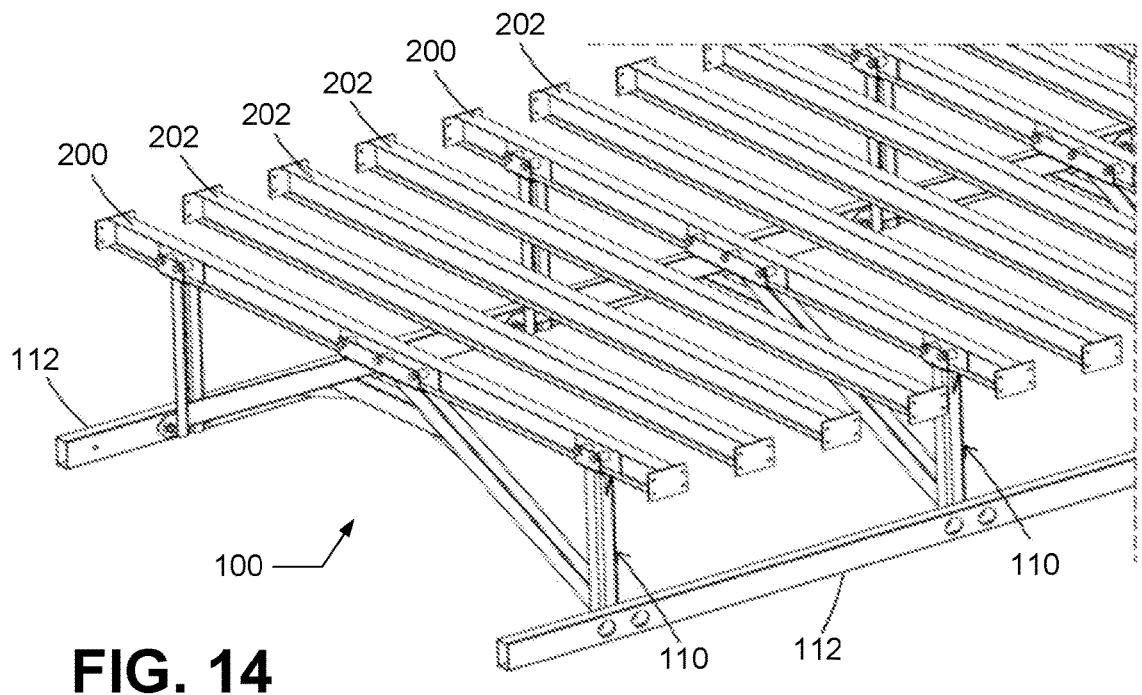
FIG. 14 is a side perspective view of the forward section of the side impact guard in accordance with one implementation of the present disclosure.

FIG. 13 is a bottom perspective view of the side impact guard 100 including only the reinforced crossmember assemblies 200, the lattice assemblies 110, and the horizontal members 112 in accordance with one implementation of the present disclosure;

FIG. 14 is a side perspective view of the forward section of the side impact guard 100 showing the lattice assemblies 110, the horizontal members 112, and both the reinforced crossmember assemblies 200 and the un-reinforced crossmember assemblies 202 in accordance with one implementation of the present disclosure.

Figure 15:
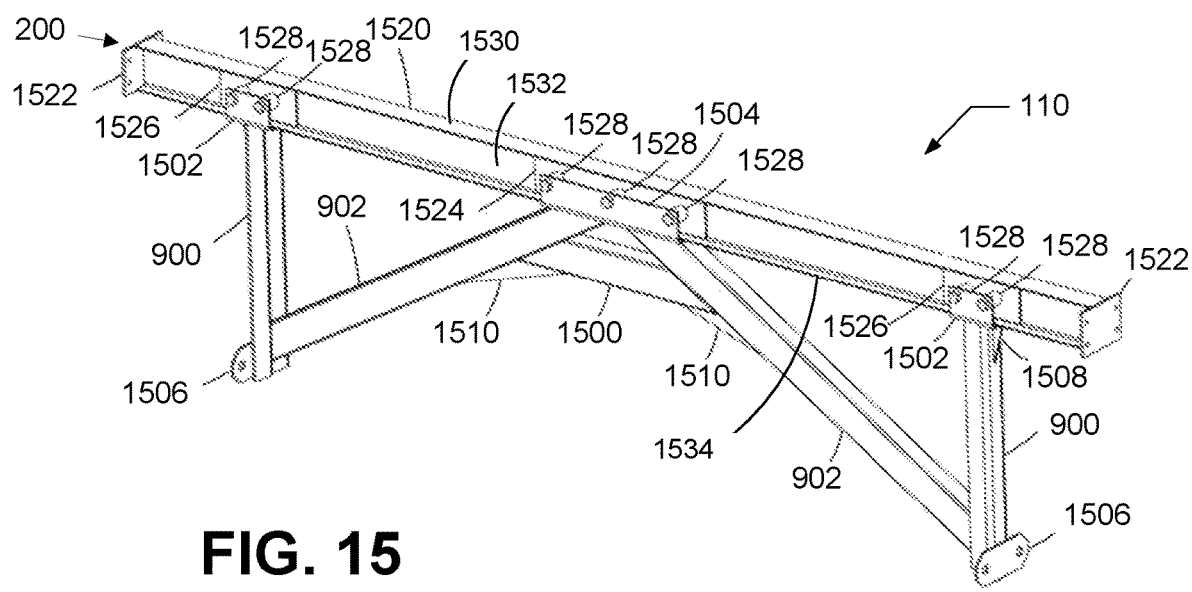
FIG. 15 is a perspective view of a lattice assembly mounted on a reinforced crossmember assembly in accordance with one implementation of the present disclosure.

FIG. 15 is a perspective view of a lattice assembly 110 mounted on a reinforced crossmember assembly 200 in accordance with one implementation of the present disclosure. In the illustrated implementation of FIG. 15, the lattice assembly 110 includes, among others, a pair of vertical struts 900 (one on each side), a pair of diagonal struts 902 (one on each side), one horizontal strut 1500 (in the middle), two outer mount plates 1502 (one on each side), one inner mount plate 1504 (in the middle), and two lower mount plates 1506 (one on each side), which are used to attach the lattice assembly 110 to the horizontal member 112. In the illustrated implementation of FIG. 15, each of the lower mount plates 1506 includes two holes for attaching the lower mount plates 1506 to the horizontal member 112.

In some implementations, the lattice assembly 110 includes only some of the items enumerated above. For example, in an alternative implementation, the lattice assembly 110 includes only the pair of vertical struts 900 and the pair of diagonal struts 902.

In one implementation, the vertical struts 900 are made of a steel plating formed into a C-channel cross section. In one implementation, the diagonal struts 902 are made of rectangular steel bar. In one implementation, the horizontal strut 1500 is made of a rectangular steel tube. In one implementation, the outer mount plates 1502 and the inner mount plate 1504 are made of steel plating formed into a C-channel cross section. In one implementation, the outer mount plates 1502 have holes for 2 fasteners, while the inner mount plate 1504 has holes for 3 fasteners). In one implementation, the lower mount plates 1506 are made of steel plating with holes for 2 fasteners.

In one implementation, the vertical struts 900 are welded to the outer mount plates 1502 and the diagonal struts 902 are welded to the inner mount plate 1504. In an alternative implementation, the vertical struts 900 are attached to the outer mount plates 1502 and the diagonal struts 902 are attached to the inner mount plate 1504 by other means such as with nuts and screws and/or other fasteners. In one implementation, the other ends (i.e., the ends which are not welded to the outer 1502 and inner mount plates 1504) of the vertical struts 900 and the diagonal struts 902 are welded together (one welding point on each side). In one implementation, the lower mount plates 1506 are attached to the vertical struts 900, near the welding point.

In the illustrated implementation of FIG. 15, the horizontal strut 1500 is positioned at a middle point between the pair of vertical struts 900 and is attached to both diagonal struts 902. The primary purpose of the horizontal strut 1500 is to transfer energy from one diagonal strut to the other diagonal strut and not cause the diagonal struts 902 to pierce into a floor structure (e.g., the bay assembly 2) of the trailer 130 at the center (i.e., the middle point). In one implementation, gussets 1510 are attached (e.g., welded) between the horizontal strut 1500 and the diagonal strut 902 (one on each side), and gussets 1508 are attached (e.g., welded) between the outer mount plates 1502 and the vertical struts 900 (one on each side). In one implementation, the struts 900, 902, 1500 are formed for energy absorption, while the gussets 1508, 1510 are formed to reduce the possibility of twisting during a loading situation (i.e., in a crash).

In the illustrated implementation of FIG. 15, the reinforced crossmember assembly 200 is formed with a single crossmember with clearance holes, doubler plates 1524, 1526 with the same clearance holes as the crossmember, round tubes 1528 placed in the clearance holes, and a pair of attachment plates 1522 at the ends of the crossmember. The attachment plates 1522 attach to the side bottom rail 210. In one implementation, the clearance holes are added to the web 1532 of the I-beam 1520 (in between the upper 1530 and lower flanges 1534) at the mount points of the outer sides (2 holes per side) and in the middle (3 holes) of the crossmember. In one implementation, the doubler plates 1524, 1526 with the same clearance holes as the crossmember are welded to the crossmembers at the outer sides and middle on either one or both sides on the web 1532 of the I-beam 1520. That is, at least one doubler plate may be used on either one or both sides on the web 1532 of the I-beam 1520. In one implementation, the round tubes 1528 are placed in the clearance holes (sit in the middle of the I-beam 1520) and are welded on both sides of the beams. The primary purpose of the doubler plates 1524, 1526 is to allow the crossmember assembly 200 to absorb more energy, and transfer less energy to the rest of the trailer structure, while the primary purpose of the round tubes 1528 is to hold the fasteners in place. Although the figures show three clearance holes, round tubes 1528, and corresponding screws and nuts for the inner mount plate, and two clearance holes, round tubes 1528, and corresponding screws and nuts for each of the outer mount plates, each of the inner mount plate and outer mount plates may be held in place with one or more (i.e., at least one) holes, round tubes, and corresponding screws and nuts. That is, the figures are shown for purposes of example only.

Figure 16:
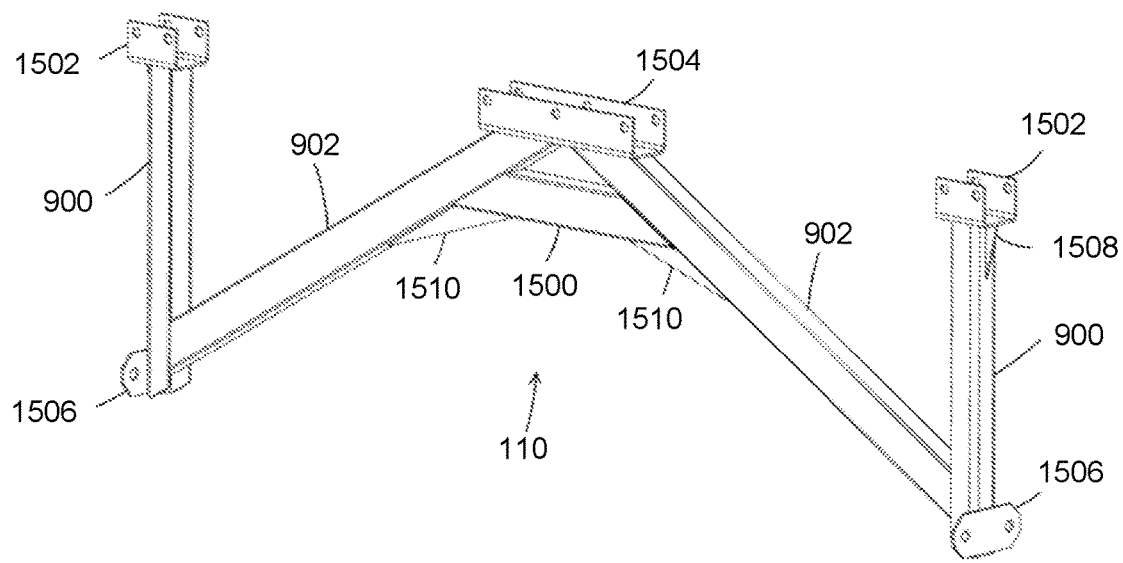
FIG. 16 is a perspective view of the lattice assembly in accordance with one implementation of the present disclosure.

FIG. 16 is a perspective view of the lattice assembly 110 in accordance with one implementation of the present disclosure. The illustrated implementation of FIG. 16 shows, in detail, the lattice assembly 110 including, among others, a pair of vertical struts 900 (one on each side), a pair of diagonal struts 902 (one on each side), one horizontal strut 1500 (in the middle), two outer mount plates 1502 (one on each side), one inner mount plate 1504 (in the middle), two lower mount plates 1506 (one on each side), and two gussets 1508, 1510. Generally, the low mount plates 1506 are mounting positions of the horizontal members 112.

Figure 17:
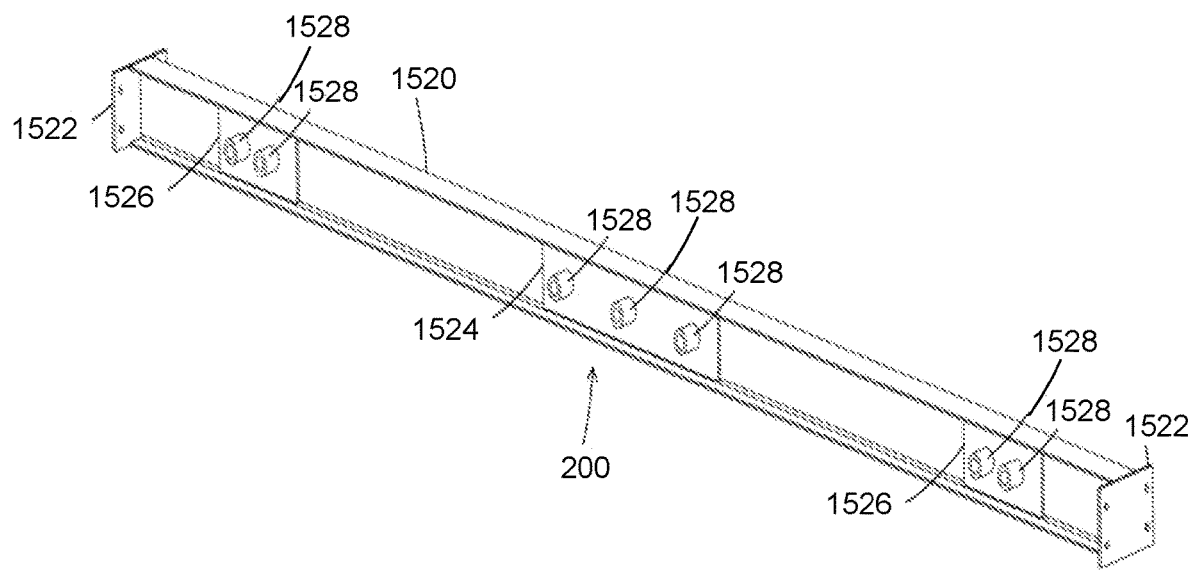
FIG. 17 is a perspective view of the reinforced crossmember assembly in accordance with one implementation of the present disclosure.

FIG. 17 is a perspective view of the reinforced crossmember assembly 200 in accordance with one implementation of the present disclosure. The illustrated implementation of FIG. 17 shows, in detail, the reinforced crossmember assembly 200 including, among others, the crossmember with clearance holes, the doubler plates 1524, 1526, the round tubes 1528, and the pair of attachment plates 1522.

Figure 18:
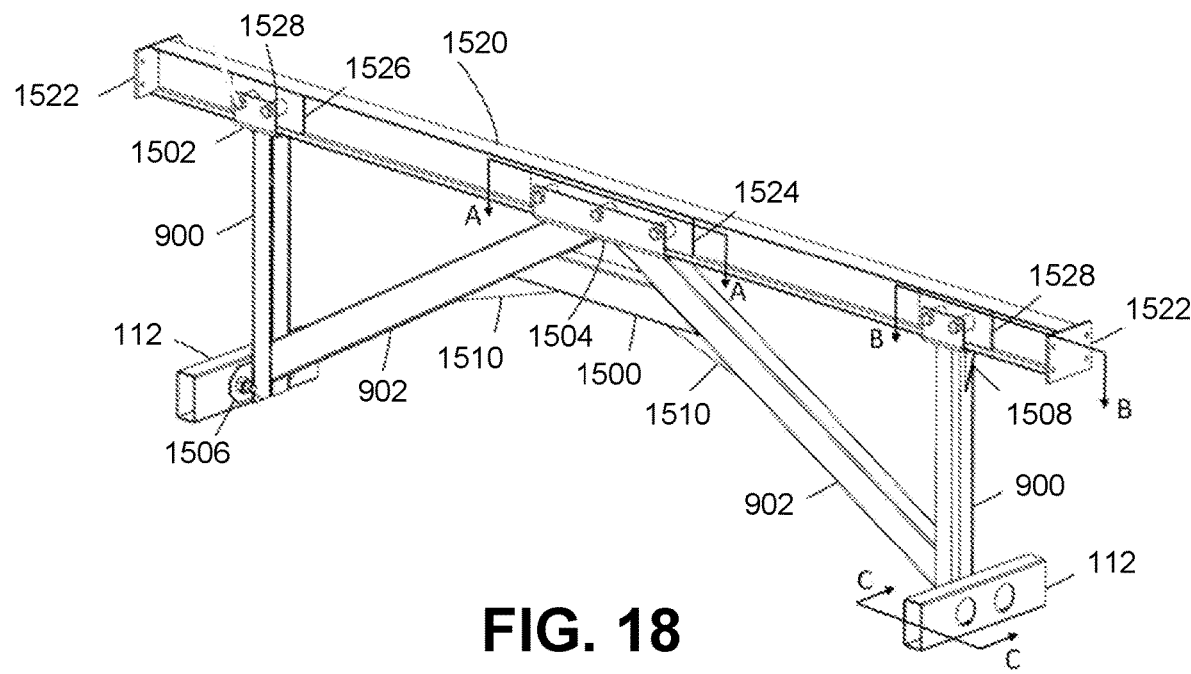
FIG. 18 is a perspective view of a single lattice cut away of the side impact guard in accordance with one implementation of the present disclosure.

FIG. 18 is a perspective view of a single lattice cut away of the side impact guard 100 in accordance with one implementation of the present disclosure. The illustrated implementation of FIG. 18 shows, in detail, the side impact guard 100 including, among others, the lattice assembly 110, the reinforced crossmember assembly 200, and a single lattice cut away of the pair of horizontal members 112.

Figure 19:
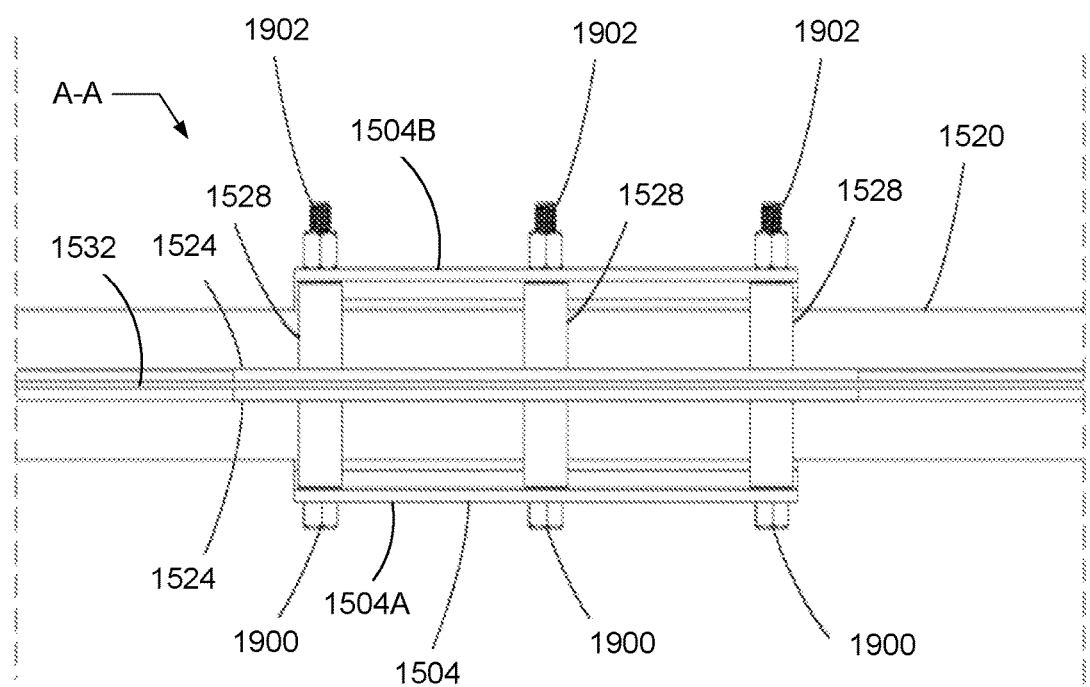
FIG. 19 is a top view section A-A of the side impact guard shown in FIG. 18 in accordance with one implementation of the present disclosure.

FIG. 19 is a top view of section A-A of the side impact guard 100 shown in FIG. 18 in accordance with one implementation of the present disclosure. The illustrated implementation of FIG. 19 shows, in detail, the middle section of the reinforced crossmember assembly 200 including, among others, the inner mount plate 1504, the two doubler plates 1524 on both sides of the web 1532 of the I-beam 1520, the three round tubes 1528. In the illustrated implementation of FIG. 19, three matching clearance holes are made on the web 1532 of the I-beam 1520, the doubler plates 1524, and both sides 1504A, 1504B of the inner mount plate 1504. Subsequently, the three round tubes 1528 are inserted into the matching clearance holes, and three screws 1900 are inserted into the clearance holes on one side (e.g., 1504A) of the inner mount plate 1504, into the round tubes 1528, and through the clearance holes on the other side (e.g., 1504B) of the inner mount plate 1504. Finally, the screws 1900 are tightened using three nuts 1902 on the other side (e.g., 1504B) of the inner mount plate 1504.

Figure 20:
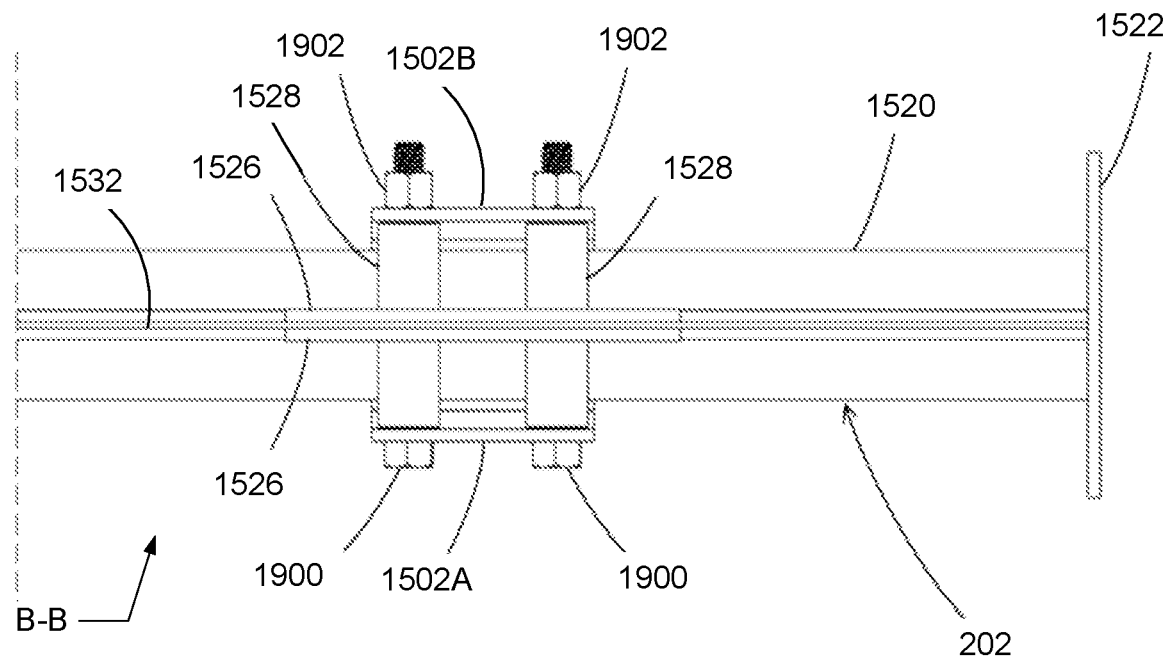
FIG. 20 is a top view section B-B of the side impact guard shown in FIG. 18 in accordance with one implementation of the present disclosure.

FIG. 20 is a top view of section B-B of the side impact guard 100 shown in FIG. 18 in accordance with one implementation of the present disclosure. In the illustrated implementation of FIG. 20, two matching clearance holes are made on the web 1532 of the I-beam 1520, the doubler plates 1526, and both sides 1502A, 1502B of the outer mount plate 1502. Subsequently, the two round tubes 1528 are inserted into the matching clearance holes, and two screws 1900 are inserted into the clearance holes on one side (e.g., 1502A) of the outer mount plate 1502, into the round tubes 1528, and through the clearance holes on the other side (e.g., 1502B) of the outer mount plate 1502. Finally, the screws 1900 are tightened using two nuts 1902 on the other side (e.g., 1502B) of the outer mount plate 1502.

Figure 21:
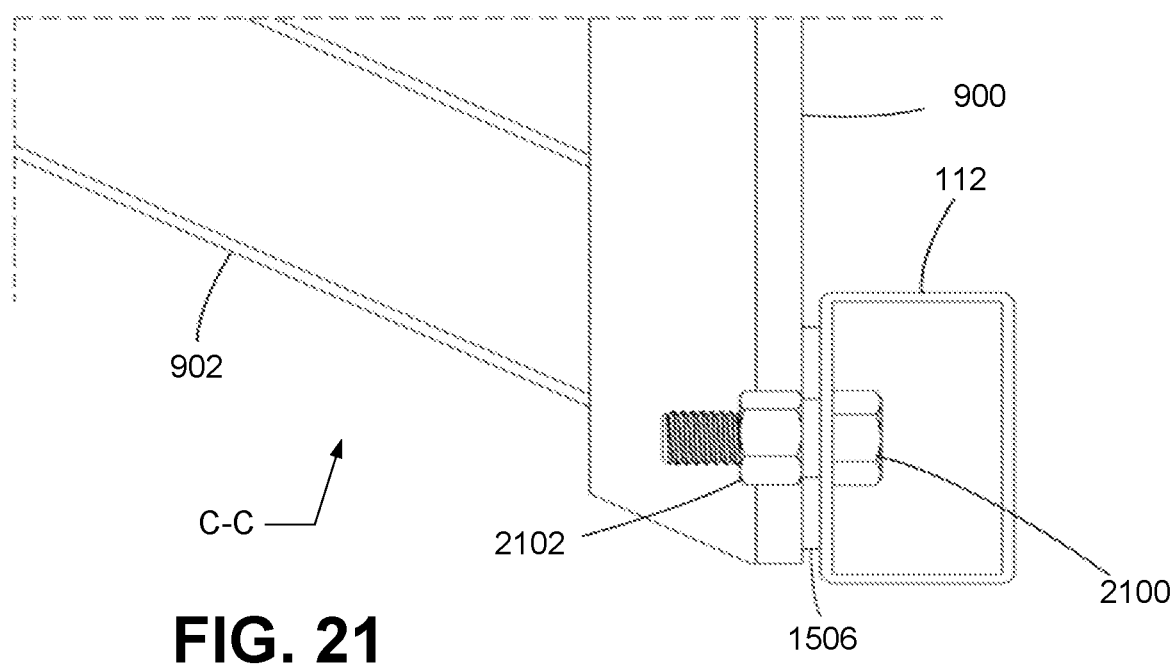
FIG. 21 is a front view section C-C of the side impact guard shown in FIG. 18 in accordance with one implementation of the present disclosure.

FIG. 21 is a front view of section C-C of the side impact guard 100 shown in FIG. 18 in accordance with one implementation of the present disclosure. In the illustrated implementation of FIG. 21, clearance holes are made on the horizontal member 112 to match the holes on the lower mount plates 1506 and a screw 2100 is inserted into the clearance hole on the horizontal member 112 through the hole on the lower mount plates 1506. The screw 2100 is tightened using a nut 2102.

In a particular implementation, a side impact guard for a trailer includes a plurality of un-reinforced crossmember assemblies, a plurality of reinforced crossmember assemblies, and a plurality of lattice assemblies. The plurality of un-reinforced crossmember assemblies is spaced out and attached to a base assembly of the trailer. The plurality of reinforced crossmember assemblies is spaced out between the plurality of un-reinforced crossmember assemblies. Each lattice assembly is coupled to a reinforced crossmember assembly and includes a pair of vertical struts, a pair of diagonal struts, and a horizontal strut. Each of the pair of vertical struts attaches to the reinforced crossmember assembly at one end and the pair of diagonal struts at the other end. Each of the pair of diagonal struts attaches to the reinforced crossmember assembly at one end the vertical struts at the end. The horizontal strut attaches to the pair of diagonal struts.

In one implementation, the side impact guard further includes: first and second outer mount plates to couple the pair of vertical struts to outer portions of the reinforced crossmember assembly; and an inner mount plate to couple the pair of diagonal struts inner portion of the reinforced crossmember assembly. In one implementation, each of the first and second outer mount plates includes at least one clearance hole. In another implementation, each of the first and second outer mount plates includes at least two clearance holes. In one implementation, the side impact guard further includes: at least one doubler plate attached to the outer portions of the reinforced crossmember assembly, wherein the at least one doubler plate includes at least one clearance hole corresponding to the at least one clearance holes in the at least one outer mount plate. In another implementation, the side impact guard further includes: first and second outer doubler plates attached to the outer portions of the reinforced crossmember assembly, wherein each of the first and second outer doubler plates includes at least two clearance holes corresponding to the at least two clearance holes in each of the first and second outer mount plates. In one implementation, the side impact guard further includes at least one round tube inserted into the at least one clearance hole in the at least one outer doubler plate. In another implementation, the side impact guard further includes a plurality of round tubes inserted into the at least two clearance holes in each of the first and second outer doubler plates. In one implementation, side impact guard further includes at least one screw to pass through the at least one clearance hole in each of the at least one outer mount plate and the at least one round tube. In another implementation, side impact guard further includes a plurality of screws to pass through the at least two clearance holes in each of the first and second outer mount plates and the plurality of round tubes.

In another particular implementation, a side impact guard for a trailer includes a plurality of crossmember assemblies and a plurality of lattice assemblies. The plurality of crossmember assemblies is coupled to a base assembly of the trailer, and each crossmember assembly of the plurality of crossmember assemblies is one of an un-reinforced crossmember assembly or a reinforced crossmember assembly. Each lattice assembly of the plurality of lattice assemblies is coupled to the reinforced crossmember assembly. Each lattice assembly also includes first and second vertical struts, first and second diagonal struts, and a horizontal strut. A first end of the first vertical strut couples to a first outer portion of the reinforced crossmember assembly and a second end of the first vertical strut couples to a second end of the first diagonal strut. A first end of the first diagonal strut couples to an inner portion of the reinforced crossmember assembly. A first end of the second vertical strut couples to a second outer portion of the reinforced crossmember assembly and a second end of the second vertical strut couples to a second end of the second diagonal strut. A first end of the second diagonal strut couples to the inner portion of the reinforced crossmember assembly. A first end of the horizontal strut couples to an upper portion of the first diagonal strut and a second end of the horizontal strut couples to an upper portion of the second diagonal strut.

In one implementation, the side impact guard further includes a first outer mount plate to couple the first end of the first vertical strut to the first outer portion of the reinforced crossmember assembly; a second outer mount plate to couple the first end of the second vertical strut to the second outer portion of the reinforced crossmember assembly; and an inner mount plate to couple the first end of the first diagonal strut and the first end of the second diagonal strut to the inner portion of the reinforced crossmember assembly. In one implementation, each of the first and second outer mount plates is formed with first and second sides, and each of the first and second sides includes at least two clearance holes. In one implementation, the side impact guard further includes: at least one outer doubler plate attached to at least one side of the reinforced crossmember assembly, wherein the at least one outer doubler plates includes at least one clearance hole corresponding to the at least one clearance hole in each of the first and second outer mount plates; and a plurality of screws, wherein at least one screw of the plurality of screws pass through the at least one clearance hole on the first side of the first outer mount plate, the at least one clearance hole on the at least one outer doubler plate, and the at least one clearance hole on the second side of the at least one outer mount plate, and wherein at least one screw of the plurality of screws pass through the at least one clearance hole on the first side of the second outer mount plate, the at least one clearance hole on the at least one outer doubler plate, and the at least one clearance hole on the second side of the at least one outer mount plate. In another implementation, the side impact guard further includes: first and second outer doubler plates attached to both sides of the reinforced crossmember assembly, wherein each of the first and second outer doubler plates includes at least two clearance holes corresponding to the at least two clearance holes in each of the first and second outer mount plates; and a plurality of screws, wherein at least two screws of the plurality of screws pass through the at least two clearance holes on the first side of the first outer mount plate, the at least two clearance holes on the first outer doubler plates, and the at least two clearance holes on the second side of the first outer mount plate, and wherein at least two screws of the plurality of screws pass through the at least two clearance holes on the first side of the second outer mount plate, the at least two clearance holes on the second outer doubler plates, and the at least two clearance holes on the second side of the second outer mount plate. In one implementation, the side impact guard further includes at least one round tube inserted into the at least one clearance hole in the at least one outer doubler plate. In another implementation, the side impact guard further includes a plurality of round tubes inserted into the at least two clearance holes in each of the first and second outer doubler plates.

In one implementation, the inner mount plate is formed with first and second sides, and wherein each of the first and second sides includes at least one clearance hole. In another implementation, the inner mount plate is formed with first and second sides, and wherein each of the first and second sides includes at least three clearance holes. In one implementation, the side impact guard further includes: at least one inner doubler plate attached to at least one side of the reinforced crossmember assembly, wherein the at least one inner doubler plates plate includes at least one clearance hole corresponding to the at least one clearance hole in the inner mount plate; and at least at least one screw to pass through the at least one clearance hole on the first side of the inner mount plate, the at least one clearance hole on the at least one inner doubler plate, and the at least one clearance hole on the second side of the inner mount plate. In another implementation, the side impact guard further includes: inner doubler plates attached to both sides of the reinforced crossmember assembly, wherein the inner doubler plates include at least three clearance holes corresponding to the at least three clearance holes in the inner mount plate; and at least three screws to pass through the at least three clearance holes on the first side of the inner mount plate, the at least three clearance holes on the inner doubler plates, and the at least three clearance holes on the second side of the inner mount plate. In one implementation, the side impact guard further includes at least one round tube inserted into the at least one clearance hole in the at least one inner doubler plate. In another implementation, the side impact guard further includes a plurality of round tubes inserted into the at least three clearance holes in the inner doubler plates. In one implementation, the first end of the first vertical strut is welded to the first outer mount plate, the first end of the second vertical strut is welded to the second outer mount plate, and the first ends of the first and second diagonal struts are welded to the inner mount plate. In another implementation, the first end of the first vertical strut is welded to the first outer mount plate, the first end of the second vertical strut is welded to the second outer mount plate, and the first ends of the first and second diagonal struts are welded to the inner mount plate. In one implementation, the side impact guard further includes: a first horizontal member coupled to second ends of first vertical struts of the plurality of lattice assemblies; and a second horizontal member coupled to second ends of second vertical struts of the plurality of lattice assemblies. In one implementation, the plurality of crossmember assemblies is evenly spaced out on the bay assembly of the trailer. In one implementation, plurality of lattice assemblies coupled to reinforced crossmember assemblies is evenly spaced out on the bay assembly of the trailer. In one implementation, the side impact guard further includes: a first gusset attached between the horizontal strut and a first diagonal strut; and a second gusset attached between the horizontal strut and a second diagonal strut. In one implementation, the side impact guard further includes: a first gusset attached between the first vertical strut and the first outer mount plate; and a second gusset attached between the second vertical strut and the second outer mount plate.

The description herein of the disclosed implementations is provided to enable any person skilled in the art to make or use the present disclosure. Numerous modifications to these implementations would be readily apparent to those skilled in the art, and the principles defined herein can be applied to other implementations without departing from the spirit or scope of the present disclosure. Thus, the present disclosure is not intended to be limited to the implementations shown herein but is to be accorded the widest scope consistent with the principal and novel features disclosed herein. Accordingly, additional variations and implementations are also possible.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A side impact guard for a trailer, comprising:
a plurality of un-reinforced crossmember assemblies spaced out and attached to a base assembly of the trailer;
a plurality of reinforced crossmember assemblies spaced out between the plurality of un-reinforced crossmember assemblies; and
a plurality of lattice assemblies, wherein each lattice assembly is coupled to a reinforced crossmember assembly,
each lattice assembly including a pair of vertical struts, a pair of diagonal struts, and a horizontal strut,
wherein each of the pair of vertical struts attaches to the reinforced crossmember assembly at one end and the pair of diagonal struts at the other end,
wherein each of the pair of diagonal struts attaches to the reinforced crossmember assembly at one end and the vertical struts at the other end,
wherein the horizontal strut attaches to the pair of diagonal struts.

2. The side impact guard of claim 1, further comprising:
first and second outer mount plates to couple the pair of vertical struts to outer portions of the reinforced crossmember assembly; and
an inner mount plate to couple the pair of diagonal struts to the inner portion of the reinforced crossmember assembly.

3. The side impact guard of claim 2, wherein each of the first and second outer mount plates includes at least one clearance hole.

4. The side impact guard of claim 3, further comprising:
at least one doubler plate attached to the outer portions of the reinforced crossmember assembly, wherein the at least one doubler plate includes at least one clearance hole corresponding to the at least one clearance hole in the at least one outer mount plate.

5. The side impact guard of claim 4, further comprising at least one round tube inserted into the at least one clearance hole in the at least one outer doubler plate.

6. The side impact guard of claim 5, further comprising at least one screw to pass through the at least one clearance hole in each of the at least one outer mount plate and the at least one round tube.

7. A side impact guard for a trailer, the side impact guard comprising:
a plurality of crossmember assemblies coupled to a base assembly of the trailer, wherein each crossmember assembly of the plurality of crossmember assemblies is one of an un-reinforced crossmember assembly or a reinforced crossmember assembly;
a plurality of lattice assemblies, each lattice assembly of the plurality of lattice assemblies coupled to the reinforced crossmember assembly,
wherein each lattice assembly includes first and second vertical struts, first and second diagonal struts, and a horizontal strut,
wherein a first end of the first vertical strut couples to a first outer portion of the reinforced crossmember assembly and a second end of the first vertical strut couples to a second end of the first diagonal strut,
wherein a first end of the first diagonal strut couples to an inner portion of the reinforced crossmember assembly,
wherein a first end of the second vertical strut couples to a second outer portion of the reinforced crossmember assembly and a second end of the second vertical strut couples to a second end of the second diagonal strut,
wherein a first end of the second diagonal strut couples to the inner portion of the reinforced crossmember assembly,
wherein a first end of the horizontal strut couples to an upper portion of the first diagonal strut and a second end of the horizontal strut couples to an upper portion of the second diagonal strut.

8. The side impact guard of claim 7, further comprising:
a first outer mount plate to couple the first end of the first vertical strut to the first outer portion of the reinforced crossmember assembly;
a second outer mount plate to couple the first end of the second vertical strut to the second outer portion of the reinforced crossmember assembly; and
an inner mount plate to couple the first end of the first diagonal strut and the first end of the second diagonal strut to the inner portion of the reinforced crossmember assembly.

9. The side impact guard of claim 8, wherein each of the first and second outer mount plates is formed with first and second sides, and
wherein each of the first and second sides includes at least one clearance hole.

10. The side impact guard of claim 9, further comprising:
at least one outer doubler plate attached to at least one side of the reinforced crossmember assembly,
wherein the at least one outer doubler plate includes at least one clearance hole corresponding to the at least one clearance hole in each of the first and second outer mount plates; and
a plurality of screws,
wherein at least one screw of the plurality of screws passes through the at least one clearance hole on the first side of the first outer mount plate, the at least one clearance hole on the at least one outer doubler plate, and the at least one clearance hole on the second side of the at least one outer mount plate, and wherein at least one screw of the plurality of screws pass through the at least one clearance hole on the first side of the second outer mount plate, the at least one clearance hole on the at least one outer doubler plate, and the at least one clearance hole on the second side of the at least one outer mount plate.

11. The side impact guard of claim 10, further comprising at least one round tube inserted into the at least one clearance hole in the at least one outer doubler plate.

12. The side impact guard of claim 8, wherein the inner mount plate is formed with first and second sides, and
wherein each of the first and second sides includes at least one clearance hole.

13. The side impact guard of claim 12, further comprising:
at least one inner doubler plate attached to at least one side of the reinforced crossmember assembly,
wherein the at least one inner doubler plate includes at least one clearance hole corresponding to the at least one clearance hole in the inner mount plate; and
at least one screw to pass through the at least one clearance hole on the first side of the inner mount plate, the at least one clearance hole on the at least one inner doubler plate, and the at least one clearance hole on the second side of the inner mount plate.

14. The side impact guard of claim 13, further comprising at least one round tube inserted into the at least one clearance hole in the at least one inner doubler plate.

15. The side impact guard of claim 8,
wherein the first end of the first vertical strut is welded to the first outer mount plate,
wherein the first end of the second vertical strut is welded to the second outer mount plate, and
wherein the first ends of the first and second diagonal struts are welded to the inner mount plate.

16. The side impact guard of claim 7, further comprising:
a first horizontal member coupled to second ends of first vertical struts of the plurality of lattice assemblies; and
a second horizontal member coupled to second ends of second vertical struts of the plurality of lattice assemblies.

17. The side impact guard of claim 7, further comprising:
a first gusset attached between the horizontal strut and a first diagonal strut; and
a second gusset attached between the horizontal strut and a second diagonal strut.

18. The side impact guard of claim 8, further comprising:
a first gusset attached between the first vertical strut and the first outer mount plate; and
a second gusset attached between the second vertical strut and the second outer mount plate.

* * * * *